United States Patent
Howard et al.

(10) Patent No.: US 8,170,634 B2
(45) Date of Patent: May 1, 2012

(54) POLYPOD ANTENNA

(75) Inventors: John Howard, Upper Mount Bethal, PA (US); Charilaos Paraskevaidis, East Hanover, NJ (US)

(73) Assignee: ET Industries, Inc., Boonton, NJ (US)

( * ) Notice: Subject to any disclaimer, the term of this patent is extended or adjusted under 35 U.S.C. 154(b) by 730 days.

(21) Appl. No.: 12/200,317

(22) Filed: Aug. 28, 2008

(65) Prior Publication Data
US 2009/0061789 A1 Mar. 5, 2009

Related U.S. Application Data

(60) Provisional application No. 60/967,042, filed on Aug. 31, 2007.

(51) Int. Cl.
*H04M 1/00* (2006.01)
(52) U.S. Cl. ............ 455/575.7; 455/63.4; 343/807
(58) Field of Classification Search .......... 343/725, 343/729, 807, 863; 455/63.4, 65, 66.1, 67.16, 455/82, 83, 84, 562.1, 575.7, 13.3
See application file for complete search history.

(56) References Cited

U.S. PATENT DOCUMENTS

| 4,268,829 | A | 5/1981 | Baurle et al. |
| 5,442,336 | A | 8/1995 | Murphy et al. |
| 6,100,846 | A | 8/2000 | Li et al. |
| 6,359,588 | B1 | 3/2002 | Kuntzsch |
| 6,480,170 | B1 | 11/2002 | Langley et al. |
| 6,944,437 | B2 * | 9/2005 | Yang et al. ............... 455/323 |
| 2003/0162566 | A1 * | 8/2003 | Shapira et al. ............ 455/561 |
| 2007/0109183 | A1 * | 5/2007 | Kimata .................... 342/354 |

* cited by examiner

*Primary Examiner* — Ping Hsieh
(74) *Attorney, Agent, or Firm* — Hoffman & Baron, LLP

(57) ABSTRACT

Embodiments of the present invention include antennas for transmitting and receiving electromagnetic signals. The antennas are configured to transmit a first electromagnetic signal at full power via a first set of radiating elements and to transmit the first electromagnetic signal at an attenuated power via a second set of radiating elements to decrease side lobes associated with the transmission of the first electromagnetic signal. The antennas are configured to receive a second electromagnetic signal having an associated first power level via the second set of radiating elements and to form an aggregated electromagnetic signal having a second power level that is a multiple of the first power level. The antennas are configured to attenuate the aggregated signal to form an attenuated electromagnetic signal having a third power level to facilitate uniform reception of the second electromagnetic signal and tapered transmission.

16 Claims, 1 Drawing Sheet

POLYPOD ANTENNA

CROSS-REFERENCE TO RELATED APPLICATION

The present application claims priority to U.S. Provisional Patent Application Ser. No. 60/967,042 filed Aug. 31, 2007, the disclosure of which is incorporated herein by reference in its entirety.

BACKGROUND OF THE INVENTION

1. Field of the Invention

The present invention generally relates to antennas, and more particularly to polypod antennas.

2. Brief Discussion of Related Art

An array antenna can include a number of transmitting/receiving elements. Tapering is preferably achieved by applying specific attenuation to sets of radiating elements. The attenuation applied to sets of radiating elements can have the effect of decreasing the sidelobes of the overall antenna. Typically, however, when the antenna is receiving a signal, the effect of tapering is still apparent and so the reception is non-uniform. This non-uniform reception is often detrimental to the receiving system and can cause a decrease in isolation on a beamformer network connected to the input of a phased array antenna. Therefore, it is beneficial and/or advantageous to taper transmission without tapering reception.

SUMMARY OF THE PRESENT INVENTION

In some aspects, a device for transmitting and receiving electromagnetic signals including an antenna. The antenna is configured to transmit a first electromagnetic signal at full power via a first set of radiating elements and to transmit the first electromagnetic signal at an attenuated power via a second set of radiating elements to decrease side lobes associated with the transmission of the first electromagnetic signal. The antenna is configured to receive a second electromagnetic signal having an associated first power level via the second set of radiating elements and to form an aggregated electromagnetic signal having a second power level that is a multiple of the first power level. The antenna is configured to attenuate the aggregated signal to form an attenuated electromagnetic signal having a third power level to facilitate uniform reception of the second electromagnetic signal and tapered transmission.

In other aspects, a method for receiving and transmitting an electromagnetic signal is disclosed. The method includes radiating a first electromagnetic signal at full power via a first set of radiating elements, radiating the first electromagnetic signal at an attenuated power via a second set of radiating elements to decrease side lobes associated with the transmission of the first electromagnetic signal, and receiving a second electromagnetic signal having an associated first power level via the second set of radiating elements. The method also includes forming an aggregated electromagnetic signal having a second power level that is a multiple of the first power level and attenuating the aggregated signal to form an attenuated electromagnetic signal having a third power level to facilitate uniform reception of the second electromagnetic signal and tapered transmission.

In yet other aspects, an antenna configured for tapered transmission and untapered reception is disclosed. The antenna includes radiating elements, a power manipulation unit, and an attenuator. The radiating elements configured to receive an electromagnetic signal propagating through a medium and to convert the electromagnetic signal into guided electromagnetic signals. The power manipulation unit is operatively coupled to a set of the radiating elements The power manipulation unit is configured to aggregate the guided electromagnetic signals received by the set of the radiating elements to form an aggregated signal. The attenuator is operatively coupled to the power manipulation unit to receive the aggregated signal. The attenuator is configured to attenuate the aggregated signal to facilitate uniform reception.

Aspects of the present invention will become apparent upon consideration of the disclosed preferred embodiments, particularly when taken in conjunction with the accompanying drawings, wherein like reference numerals in the various figures are utilized to designate like components.

DETAILED DESCRIPTION OF THE PREFERRED EMBODIMENTS

Preferred embodiments of the present invention are directed to polypod antennas that utilize a technique for achieving tapered transmission on an antenna array, but maintaining uniformity when receiving. The polypod antennas achieve tapered transmission and non-tapered reception by preferably employing a combination of attenuators and power manipulation units. The attenuators are preferably placed on or before the feeding network of the antenna in order to attenuate a desired set of radiating elements. To eliminate or counteract the attenuation when receiving with the polypod antenna, the number of elements for the attenuated set of radiating elements is preferably increased.

Figure 1:
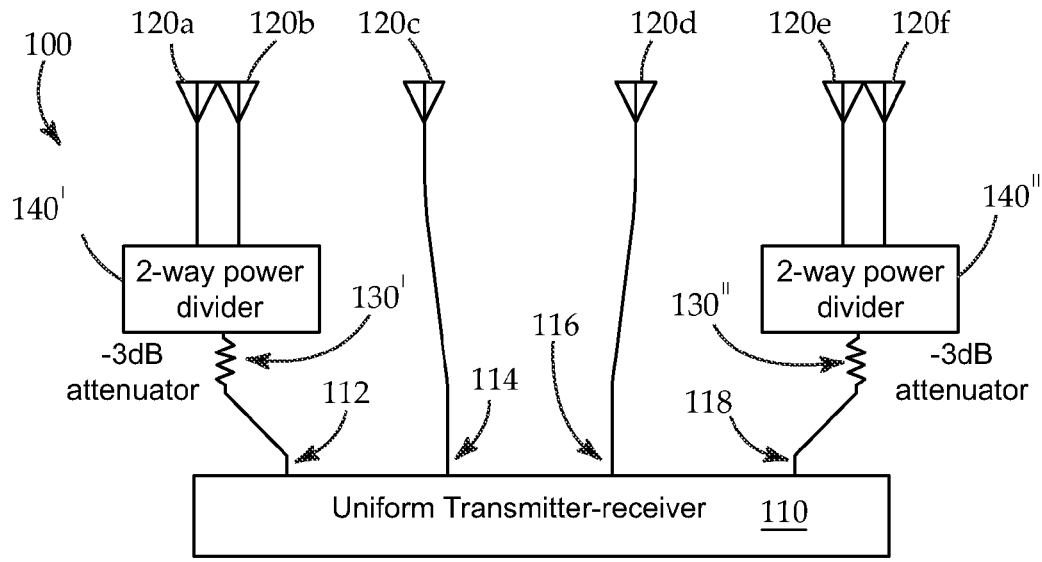
FIG. 1 depicts a block diagram of a polypod antenna in accordance with a preferred embodiment of the present invention.

FIG. 1 depicts an exemplary block diagram of a preferred embodiment of the polypod antenna 100. The polypod antenna 100 preferably includes a transceiver 110, radiating elements 120a-f, attenuators 130' and 130" (collectively referred to herein as "attenuators 130"), and power manipulation units 140' and 140" (collectively referred to herein as "power manipulation units 140"). The power manipulation units 140 can include power dividers, which distribute or divide power of one or more signals between multiple radiating elements, and/or a power aggregator, which aggregates or multiples power of one or more signal to form a signal with amplified, intensified, or multiplied power.

The transceiver 110 is preferably adapted to transmit and/or receive electromagnetic signals via the radiating elements 120a-f. The transceiver 110 can have a number of connecting feed lines. In this example, the transceiver 110 has four connecting feed lines 112-118. The two middle radiating elements 120c-d are preferably connected to the transceiver 110 via connecting feed lines 114 and 116, respectively, without any attenuation. The sets of side radiating elements 120a-b and 120e-f are preferably connected to the transceiver 110 through attenuators 130 and power manipulation units 140 via connecting feed lines 112 and 118, respectively.

The radiating elements 120a-f can preferably receive free space electromagnetic signals propagating through the air and/or can transmit guided electromagnetic signals by radiating the guided electromagnetic signals received from the transceiver 110.

Attenuators 130' and 130" attenuate the sets of radiating elements 120a-b and 120e-f, respectively, to provide tapered guided electromagnetic signals passing to the sets of radiating elements 120a-b and 120e-f. In this manner, the set of radiating elements 120a-b and the set of radiating elements 120e-f radiate an attenuated version of the guided electromagnetic signal, while the radiating elements 120c-d radiate the guided electromagnetic signal at full power. For example, the attenuators 130 preferably reduce the power of a signal that passes through the attenuator by one half (e.g., 3 dB) or by other amounts. The attenuation applied to sets of radiating elements 120a-b and 120e-f can preferably have the effect of decreasing the sidelobes of the overall antenna 100 during transmission, which is referred to herein as "tapered transmission".

The power manipulation units 140 distribute signal power between the radiating elements connected to the power manipulation units 140. For example, the radiating elements 120a-b are preferably connected to the power manipulation unit 140'. Signal power is distributed between radiating elements 120a-b via the power manipulation unit 140'. Likewise, the radiating elements 120e-f are preferably connected to the power manipulation unit 140". Signal power is distributed between the radiating elements 120e-f via the power manipulation unit 140".

During transmission, a guided electromagnetic signal to be transmitted is sent from the transceiver 110 to the radiating elements 120a-f via the connecting feed line 112-118. The connecting feed line 114 guides the electromagnetic signal to the radiating element 120c. The connecting feed line 116 guides the electromagnetic signal to the radiating element 120d. The connecting feed line 112 guides the electromagnetic signal through the attenuator 130', where the electromagnetic signal is attenuated. Subsequently, the attenuated signal enters the power manipulation unit 140' where the attenuated signal is distributed between the radiating elements 120a-b. Likewise, the connecting feed line 118 guides the electromagnetic signal through the attenuator 130" and the power manipulation unit 140" to the radiating elements 120e-f. The power manipulation unit 140" distributes the signal power between the radiating elements 120e-f. The radiating elements 120c-d radiate the signal at its full power and the sets of radiating elements 120a-b and 120e-f radiate the attenuated signal.

For example, during transmission, the transceiver 110 may pass a 1 [units] signal through each of the connecting feed lines 112-118. Each of the connecting feed lines 114 and 116 can guide the 1 [units] signal to the radiating elements 120c and 120d, respectively. Each of the radiating elements 120c-d can then radiate the 1 [units] signal. Each of the connecting feed lines 112 and 118, however, guide the 1 [units] signal through the attenuators 130 to reduce the 1 [units] signal to a ½ [units] signal. The ½ [units] signal is passed through the power manipulation units 140, which distributes the ½ [units] signal on the connecting feed line 112 between the radiating elements 120a-b and distributes the ½ [units] signal on the connecting feed lines 118 between the radiating elements 120e-f. In one embodiment, the power manipulation units 140 distribute the ½ [units] signal equally such that each of the radiating elements 120a-b and 120e-f radiate a ¼ [units] signal.

During reception, each of the radiating elements 120a-f receives a free space electromagnetic signal propagating through a medium, such as air. The free space electromagnetic signal received by the radiating elements 120c-d is preferably guided by connecting feed line 114 and 116, respectively, to the transceiver 110. The free space electromagnetic signal received by the radiating elements 120a-b is converted into a guided electromagnetic signal that is guided through the power manipulation unit 140', where the electromagnetic signals from each of the radiating element 120a-b are combined. The combination preferably creates an intensified or aggregated signal that is based on the number of radiating elements 120a-b that are used. The intensified signal passes through the attenuator 130', where the intensified signal is attenuated. The result of the attenuation is that the power of the intensified signal is reduced. The signal received by the radiating elements 120e-f can undergo the same process as the signal received by radiating elements 120a-b. The number of radiating elements 120 for the sets of radiating elements 120a-b and 120e-f is preferably specified to compensate for the attenuation during reception of a signal by the sets of radiating elements 120a-b and 120e-f.

For example, during reception, the attenuators 130 may reduce the power of a signal on the connecting feed lines 112 and 118 by one half (½). In this example, each connecting feed line 112 and 118 that includes attenuators 130 has two radiating elements 120a-b and 120e-f to compensate for the attenuation of the attenuators 130. The antenna 100 may receive a 1 [units] signal with each of the radiating elements 120a-b. The 1 [units] signal from each radiating elements 120a-b passes through the power manipulation unit 140' which combines the 1 [units] signal from each of the radiating elements 120a-b to form a 2 [units] signal. Subsequently, the 2 [units] signal passes through the attenuator 130', which reduces the 2 [units] signal by one half (½) to form a 1 [units] signal. The 1 [units] signal is guided by the connecting feed line 112 to the transceiver 110 for processing. Therefore, the transceiver 110 receives a signal that accurately represents the signal received by the antenna 100.

Therefore, the polypod antenna 100 transmits a tapered signal via the sets of radiating elements 120a-b and 120e-f as a result of the attenuation performed by the attenuators 130. During reception, however, because there are sets of multiple radiating elements 120a-b and 120e-f for each attenuated connecting feed line 112 and 118, where each set can aggregate the signals, the attenuation compensated.

Figure 2:
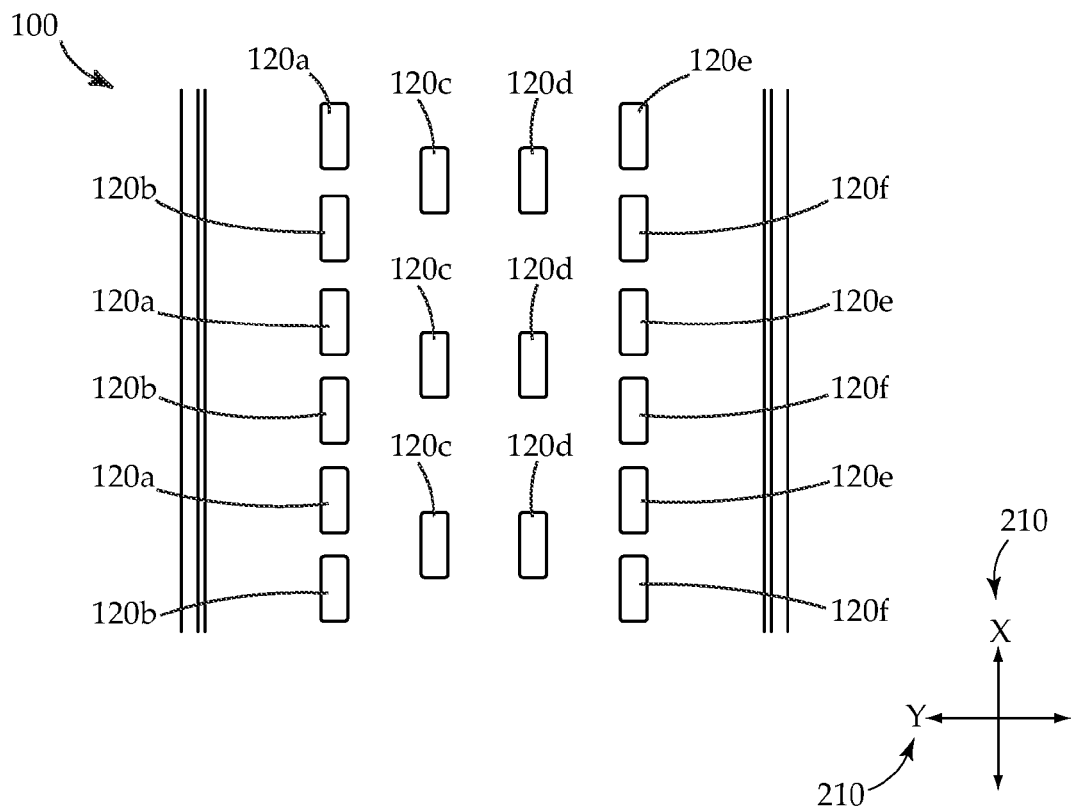
FIG. 2 depicts an arrangement of radiating elements of a polypod antenna in accordance with a preferred embodiment of the present invention.

FIG. 2 depicts an arrangement of radiating elements 120 in accordance with a preferred embodiment of the present invention. The sets of radiating elements 120a-b and 120e-f are constructed by placing the radiating elements 120a-b in close proximity to each other and by placing the radiating elements 120e-f in close proximity to each other. However, an appropriate distance is preferably maintained between the radiating elements 120a-b, as well as between the radiating elements 120e-f so that there is no gain reduction due to effective area overlap.

The sets of radiating elements 120a-b and 120e-f can be arranged along an x-axis 210 or a y-axis 220. In a preferred embodiment, the set of radiating elements 120a-b are aligned along the y-axis 220 as is the set of radiating elements 120e-f. This arrangement allows the horizontal beamwidth of each set 120a-b and 120e-f to have the same horizontal beamwidth as the single elements 120c-d of the array.

While the preferred embodiment depicts sets of two (2) radiating elements 120a-b and 120e-f for each attenuated connecting feed line 112 and 118, respectively, one skilled in the art will appreciate that any number of radiating elements can be used for each attenuated connecting feed line. In addition, the number of radiating elements for each set can be based on the amount of attenuation used.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A device for transmitting and receiving electromagnetic signals comprising:
    an antenna configured to transmit a first electromagnetic signal at full power via a first set of radiating elements and to transmit the first electromagnetic signal at an attenuated power via a second set of radiating elements such that transmission by the first and second sets of radiating elements is tapered and side lobes associated with the transmission of the first electromagnetic signal are decreased, the antenna configured to receive a second electromagnetic signal from a first radiating element of the second set of radiating elements, the second electromagnetic signal having an associated first power level, the antenna being configured to form an aggregated electromagnetic signal having a second power level that is a multiple of the first power level, the aggregated electromagnetic signal comprising the second electromagnetic signal aggregated with at least one additional electromagnetic signal received by a second radiation element of the second set of radiating elements, the antenna configured to attenuate the aggregated signal to form an attenuated electromagnetic signal having a third power level, the second power level being a multiple of the first power level, the multiple compensating for the attenuation such that the third power level is equal to the first power level, the antenna providing uniform non-tapered reception of the first electromagnetic signal and tapered transmission of the second electromagnetic signal.

2. The device of claim 1, wherein the multiple is based on a number of radiating elements in the second set.

3. The device of claim 2, wherein the multiple is equal to the number of radiating elements in the second set of radiating elements.

4. The device of claim 1, wherein the third power level is substantially equal to the quotient of the second power level divided by a number of radiating elements in the second set.

5. The device of claim 1, wherein the second set of radiating elements includes at least two radiating elements and the second power level is about twice that of the first power level.

6. The device of claim 1, wherein the antenna comprises:
    a transceiver for transmitting and receiving the first and second electromagnetic signals via the first and second sets of radiating elements.

7. The device of claim 6, wherein the second set of radiating elements is operatively coupled to the transceiver through a power manipulation unit and an attenuator.

8. A method for receiving and transmitting an electromagnetic signal comprising:
    radiating a first electromagnetic signal at full power via a first set of radiating elements;
    radiating the first electromagnetic signal at an attenuated power via a second set of radiating elements to such that transmission by the first and second sets of radiating elements is tapered and side lobes associated with the transmission of the first electromagnetic signal are decreased;
    receiving a second electromagnetic signal received from a first radiating element of the second set of radiating elements, the second electromagnetic signal having an associated first power level;
    forming an aggregated electromagnetic signal having a second power level that is a multiple of the first power level, the aggregated electromagnetic signal comprising the second electromagnetic signal aggregated with at least one additional electromagnetic signal received by a second radiation element of the second set of radiating elements, and
    attenuating the aggregated signal to form an attenuated electromagnetic signal having a third power level, the second power level being a multiple of the first power level, the multiple compensating for the attenuation such that the third power level is equal to the first power level, the antenna providing uniform non-tapered reception of the first electromagnetic signal and tapered transmission of the second electromagnetic signal.

9. The method of claim 8, wherein the multiple is based on a number of radiating elements in the second set.

10. The method of claim 8, wherein forming an aggregated electromagnetic signal comprises multiplying a number of radiating elements in the second set by the first power level.

11. The method of claim 8, wherein attenuating the aggregated signal comprises dividing the second power level by a number of radiating elements in the second set to form the attenuated electromagnetic signal having the third power level.

12. An antenna configured for tapered transmission and untapered reception comprising:
    a plurality of radiating elements configured to receive electromagnetic signals propagating through a medium and to convert the electromagnetic signal into guided electromagnetic signals;
    a power divider coupled to a set of the plurality of radiating elements, the power divider configured to aggregate the guided electromagnetic signals received by at least two different radiating elements of the set of the plurality of radiating elements to form an aggregated electromagnetic signal; and
    an attenuator coupled to the power divider to receive the aggregated electromagnetic signal, the attenuator configured to attenuate the aggregated electromagnetic signal to facilitate uniform reception, the antenna being configured to transmit a first electromagnetic signal at full power via a first set of radiating elements and to transmit the first electromagnetic signal at an attenuated power via a second set of radiating elements such that transmission by the first and second sets of radiating elements is tapered and side lobes associated with the transmission of the first electromagnetic signal are decreased, the antenna being configured to receive a second electromagnetic signal from a first radiating element of the second set of radiating elements, the second electromagnetic signal having an associated first power level, the antenna being configured to form the aggregated electromagnetic signal having a second power level that is a multiple of the first power level, the aggregated electromagnetic signal comprising the second electromagnetic signal aggregated with at least one additional electromagnetic signal received by a second radiation element of the second set of radiating elements, the antenna being configured to attenuate the aggregated signal to form an attenuated electromagnetic signal having a third power level, the second power level being a multiple of the first power level, the multiple compensating for the attenuation such that the third power level is equal to the first power level, the antenna providing uniform non-tapered reception of the first electromagnetic signal and tapered transmission of the second electromagnetic signal.

13. The antenna of claim 12 further comprising a transceiver operatively coupled to the plurality of radiating elements.

14. The antenna of claim 12, wherein the aggregated electromagnetic signal has a power level that is a multiple of a power level of the guided electromagnetic signal, the multiple being based on a number of radiating elements in the second set.

15. The antenna of claim 14, wherein the multiple is equal to the number of radiating elements in the second set.

16. The antenna of claim 12, wherein a power level of the attenuated electromagnetic signal is a factor of a power level associated with the aggregated electromagnetic signal.

* * * * *